US012640293B2

(12) United States Patent
Misumi

(10) Patent No.: US 12,640,293 B2
(45) Date of Patent: May 26, 2026

(54) MNZN-BASED FERRITE AND METHOD FOR PRODUCING SAME

(71) Applicant: TOKIN Corporation, Shiroishi (JP)

(72) Inventor: Shota Misumi, Shiroishi (JP)

(73) Assignee: TOKIN CORPORATION, Shiroishi (JP)

( * ) Notice: Subject to any disclaimer, the term of this patent is extended or adjusted under 35 U.S.C. 154(b) by 571 days.

(21) Appl. No.: 18/247,437

(22) PCT Filed: Aug. 16, 2021

(86) PCT No.: PCT/JP2021/029890
§ 371 (c)(1),
(2) Date: Mar. 30, 2023

(87) PCT Pub. No.: WO2022/070634
PCT Pub. Date: Apr. 7, 2022

(65) Prior Publication Data
US 2024/0006103 A1      Jan. 4, 2024

(30) Foreign Application Priority Data

Oct. 2, 2020      (JP) ................................. 2020-167723

(51) Int. Cl.
| | |
|---|---|
| *H01F 1/34* | (2006.01) |
| *C04B 35/26* | (2006.01) |
| *C04B 35/626* | (2006.01) |
| *C04B 35/64* | (2006.01) |

(52) U.S. Cl.
CPC ......... *H01F 1/344* (2013.01); *C04B 35/2658* (2013.01); *C04B 35/6262* (2013.01); *C04B 35/62645* (2013.01); *C04B 35/64* (2013.01); *C04B 2235/3208* (2013.01); *C04B 2235/3232* (2013.01); *C04B 2235/3274* (2013.01); *C04B 2235/3275* (2013.01); *C04B 2235/3418* (2013.01); *C04B 2235/5436* (2013.01); *C04B 2235/656* (2013.01); *C04B 2235/661* (2013.01); *C04B 2235/77* (2013.01); *C04B 2235/786* (2013.01); *C04B 2235/85* (2013.01)

(58) Field of Classification Search
CPC ....................................................... H01F 1/344
See application file for complete search history.

(56) References Cited

U.S. PATENT DOCUMENTS

| | | |
|---|---|---|
| 2008/0007377 A1 | 1/2008 | Ishiwaki et al. |
| 2020/0373047 A1 | 11/2020 | Miyoshi et al. |

FOREIGN PATENT DOCUMENTS

| | | |
|---|---|---|
| JP | H08148323 A | 6/1996 |
| JP | 2020120064 A | 8/2020 |
| WO | 2006054749 A1 | 5/2006 |
| WO | 2018181242 A1 | 10/2018 |

OTHER PUBLICATIONS

Kato et al. English machine translation of JP 2020120064 A. (Year: 2020).*
Japanese Patent Office, Office Action Issued in Application No. 2020-167723, May 28, 2024, 8 pages. (Submitted with Machine Translation).
Japanese Patent Office, Office Action Issued in Application No. 2020-167723, Aug. 13, 2024, 4 pages. (Submitted with English Translation).
China National Intellectual Property Administration, Office Action and Search Report Issued in Application No. 202180067034.0, Feb. 9, 2025, 13 pages.

* cited by examiner

*Primary Examiner* — Peter F Godenschwager
(74) *Attorney, Agent, or Firm* — McCoy Russell LLP

(57) ABSTRACT

A MnZn-based ferrite that can suppress both reduction of the loss at a high frequency and a change in magnetic properties in a high magnetic field and a method for producing the same are provided. A MnZn-based ferrite including $Fe_2O_3$, ZnO, and MnO as main components, in which $Fe_2O_3$ is 53.2 to 56.0 mol % and ZnO is 3.0 to 12.0 mol %, with a balance of MnO, in 100 mol % of the main components, the MnZn-based ferrite includes 0.005 to 0.060% by mass of $SiO_2$, 0.010 to 0.060% by mass of CaO, 0.10 to 0.40% by mass of $CO_2O_3$, and 0.05 to 0.30% by mass of $TiO_2$, as auxiliary components, per 100% by mass of the main components, an average crystal grain diameter is 4 μm or less, and a sintering density is 4.8 g/cm³ or more.

6 Claims, No Drawings

MNZN-BASED FERRITE AND METHOD FOR PRODUCING SAME

CROSS REFERENCE TO RELATED APPLICATIONS

The present application is a U.S. National Phase of International Application No. PCT/JP2021/029890 entitled "MnZn-BASED FERRITE AND METHOD OF MANU-FACTURING SAME," and filed on Aug. 16, 2021. International Application No. PCT/JP2021/029890 claims priority to Japanese Patent Application No. 2020-167723 filed on Oct. 2, 2020. The entire contents of each of the above-listed applications are hereby incorporated by reference for all purposes.

TECHNICAL FIELD

The present invention relates to a MnZn-based ferrite and a method for producing the same.

BACKGROUND ART

A MnZn-based ferrite has properties such as a high magnetic permeability, a high magnetic flux density, and easy magnetization even in a small magnetic field, and is widely used in a communication device application, a power supply application, and the like. Various studies have been made on a MnZn-based ferrite so as to obtain a property according to the intended application (for example, Patent Literatures 1 and 2).

Patent Literature 1 discloses a MnZn-based ferrite sintered body including a main component consisting of specific amounts of $Fe_2O_3$, ZnO, and MnO and an auxiliary component consisting of specific amounts of $SiO_2$, $CaCO_3$, $CO_3O_4$, $ZrO_2$, and $Ta_2O_5$, having an average crystal grain diameter of 3 μm or more and less than 8 μm, and having a sintered body density of 4.65 g/cm³ or more, as a MnZn-based ferrite sintered body having a low magnetic core loss in a wide temperature range at a high frequency of 300 to 500 kHz and having a small change in magnetic core loss over time in a high temperature environment.

In addition, Patent Literature 2 discloses a low-loss Mn—Zn ferrite including Fe, Mn, and Zn as main components, Co, Ca, and Si as first auxiliary components, and a Group Va element as a second auxiliary component in specific amounts and having an average crystal grain diameter of less than 3.2 μm and a volume low efficiency of 1 Ω·m or more, as a Mn—Zn ferrite having a low power loss in a wide temperature range and a wide operation magnetic flux density even at a high frequency of 1 MHz or more.

CITATION LIST

Patent Literature

Patent Literature 1: International Patent Publication No. WO 2018/181242

Patent Literature 2: International Patent Publication No. WO 2006/054749

SUMMARY OF INVENTION

Technical Problem

A MnZn-based ferrite is required to have a further reduced loss at a high frequency. On the other hand, the present inventor has found that a magnetic property may change when a high magnetic field is applied, depending on the method for reducing the loss.

The present invention solves the above problems, and provides a MnZn-based ferrite that can suppress both reduction of the loss at a high frequency and a change in magnetic properties in a high magnetic field, and a method for producing the same.

Solution to Problem

The MnZn-based ferrite according to the present invention includes $Fe_2O_3$, ZnO, and MnO as main components, in which $Fe_2O_3$ is 53.2 to 56.0 mol % and ZnO is 3.0 to 12.0 mol %, with a balance of MnO, in 100 mol % of the main components, the MnZn-based ferrite includes 0.005 to 0.060% by mass of $SiO_2$, 0.010 to 0.060% by mass of CaO, 0.10 to 0.40% by mass of $CO_2O_3$, and 0.05 to 0.30% by mass of $TiO_2$, as auxiliary components, per 100% by mass of the main components, an average crystal grain diameter is 4 μm or less, and a sintering density is 4.8 g/cm³ or more.

One embodiment of the above MnZn-based ferrite further includes 0.010 to 0.100% by mass of ZrO as an auxiliary component.

One embodiment of the above MnZn-based ferrite has a unit volume magnetic core loss (Pcv) at 25° C., 2 MHz, and 50 mT of 1500 mW/cm³ or less.

One embodiment of the above MnZn-based ferrite has a rate of change of the unit volume magnetic core loss (Pcv) at 25° C., 2 MHz, and 50 mT, represented by the following expression (1), of 100% or less:

$$(Pcv - Pcv_0)/Pcv_0 \times 100 \qquad \text{Expression (1)}$$

where $Pcv_0$ is the unit volume magnetic core loss before applying a magnetic field.

The method for producing a MnZn-based ferrite according to the present invention is a method for producing the MnZn-based ferrite of the present invention, including:

a step of mixing raw materials including the main components, respectively, such that $Fe_2O_3$ is 53.2 to 56.0 mol % and ZnO is 3.0 to 12.0 mol %, with a balance of MnO, in 100 mol % of the main components, after sintering;

a step of adding raw materials including the auxiliary components, respectively, such that the MnZn-based ferrite includes 0.005 to 0.060% by mass of $SiO_2$, 0.010 to 0.060% by mass of CaO, 0.10 to 0.40% by mass of $Co_2O_3$, and 0.05 to 0.30% by mass of $TiO_2$, per 100% by mass of the main components, after sintering; and a step of disintegrating a mixed powder obtained until the mixed powder becomes a disintegrated powder having a D90 particle diameter of 1.2 μm or less.

One embodiment of the above production method further includes a step of molding the disintegrated powder and heat-treating a resulting molded product at 1050 to 1150° C.

Advantageous Effects of Invention

According to the present invention, a MnZn-based ferrite that can suppress both reduction of the loss at a high frequency and a change in magnetic properties in a high magnetic field and a method for producing the same are provided.

DESCRIPTION OF EMBODIMENTS

Hereinafter, the MnZn-based ferrite and the method for producing the same according to the present invention will be described.

Unless otherwise specified, the numerical range represented by using "to" includes the lower limit value and the upper limit value thereof.

[MnZn-Based Ferrite]

The MnZn-based ferrite according to the present invention (hereinafter, also referred to as the present MnZn-based ferrite)

includes $Fe_2O_3$, ZnO, and MnO as main components, in which $Fe_2O_3$ is 53.2 to 56.0 mol % and ZnO is 3.0 to 12.0 mol %, with a balance of MnO, in 100 mol % of the main components, the MnZn-based ferrite includes 0.005 to 0.060% by mass of $SiO_2$, 0.010 to 0.060% by mass of CaO, 0.10 to 0.40% by mass of $Co_2O_3$, and 0.05 to 0.30% by mass of $TiO_2$, as auxiliary components, per 100% by mass of the main components, an average crystal grain diameter is 4 µm or less, and a sintering density is 4.8 g/cm³ or more.

The present inventor has obtained the finding that by adjusting the MnZn-based ferrite such that each metal oxide is included in the above specific proportion as described above, the average crystal grain diameter is 4 µm or less, and the sintering density is 4.8 g/cm³ or more, it is possible to reduce the loss at a high frequency (particularly 1 MHz to 3 MHz) and also suppress a change in magnetic properties after a high magnetic field is applied, and has completed the present invention.

The present inventor had obtained the finding that it is possible to reduce the loss at a high frequency by using a MnZn-based ferrite in which the hysteresis loop has a perminvar property. For the MnZn-based ferrite having a perminvar property, the residual loss associated with domain wall displacement is reduced by suppressing the displacement (pinning) of a domain wall. However, when a high magnetic field is applied, the pinning of a domain wall becomes insufficient and the mobility of the domain wall increases, and thereby the reduction of the loss may become insufficient. On the other hand, the MnZn-based ferrite contains each component in the above specific proportion and the crystal grain diameter is reduced to 4 µm or less to thereby reduce the number of domain walls in the crystal grains and reduce the residual loss associated with domain wall displacement. Specifically, the present MnZn-based ferrite can suppress the unit volume magnetic core loss (Pcv) at 25° C., 2 MHz, and 50 mT to 1500 mW/cm³ or less. Further, the present MnZn-based ferrite can set, for example, the rate of change of the unit volume magnetic core loss (Pcv) at 25° C., 2 MHz, and 50 mT represented by the following expression (1) to that before a magnetic field is applied, to 100% or less.

$$(Pcv - Pcv_0)/Pcv_0 \times 100 \qquad \text{Expression (1)}$$

As described above, the present MnZn-based ferrite has the following characteristic: even when a high magnetic field is applied, the loss at a high frequency can be reduced as in the state where no high magnetic field is applied.

The present MnZn-based ferrite includes $Fe_2O_3$, ZnO, and MnO as main components. In the present MnZn-based ferrite, $Fe_2O_3$ is 53.2 to 56.0 mol % and ZnO is 3.0 to 12.0 mol %, with a balance (33.0 to 43.8 mol %) of MnO, in 100 mol % of the main components.

By setting $Fe_2O_3$ to 53.2 mol % or more, preferably 53.5 mol % or more, a MnZn-based ferrite having a high magnetic flux density can be obtained. On the other hand, by setting $Fe_2O_3$ to 56.0 mol % or less, preferably 55.0 mol % or less, more preferably 54.8 mol % or less, a combination thereof with other components suppresses the formation of a MnZn-based ferrite into a perminvar to make it possible to reduce the loss when a high magnetic field is applied.

By setting ZnO to 3 mol % or more, preferably 6 mol % or more, a combination thereof with other components can suppress the formation of a MnZn-based ferrite into a perminvar, and the sinterability is excellent, and it is easy to adjust the crystal density to 4.8 g/cm³ or more. On the other hand, by setting ZnO to 12.0 mol % or less, preferably 11.0 mol % or less, a MnZn-based ferrite having a high magnetic flux density can be obtained.

In addition, the present MnZn-based ferrite includes at least $SiO_2$, CaO, $Co_2O_3$, and $TiO_2$ as auxiliary components.

By setting $SiO_2$ to 0.005% by mass or more, preferably 0.010% by mass or more, a grain boundary phase having a high specific resistance is sufficiently formed to suppress the generation of eddy current at a high frequency. In addition, by containing $SiO_2$, the mechanical strength of the MnZn-based ferrite is improved. On the other hand, by setting $SiO_2$ to 0.060% by mass or less, preferably 0.050% by mass or less, it is possible to suppress the generation of enlarged $SiO_2$ and suppress the deterioration of the loss.

By setting CaO to 0.010% by mass or more, preferably 0.030% by mass or more, a grain boundary phase having a high specific resistance is sufficiently formed to suppress the generation of eddy current at a high frequency. On the other hand, by setting CaO to 0.050% by mass or less, preferably 0.045% by mass or less, it is possible to suppress CaO remaining as an impurity and suppress the deterioration of the loss.

By setting $Co_2O_3$ to 0.10% by mass or more, preferably 0.20% by mass or more, the loss in a high temperature environment can be suppressed. On the other hand, by setting $Co_2O_3$ to 0.40% by mass or less, preferably 0.30% by mass or less, perminvar formation is suppressed to make it possible to reduce the loss when a high magnetic field is applied.

On the other hand, by setting $TiO_2$ to 0.05% by mass or more, preferably 0.10% by mass or more, perminvar formation is suppressed to make it possible to reduce the loss when a high magnetic field is applied. On the other hand, by setting $TiO_2$ to 0.30% by mass or less, preferably 0.25% by mass or less, perminvar formation is suppressed to make it possible to reduce the loss when a high magnetic field is applied.

The present MnZn-based ferrite may further include a further component as long as the effects of the present invention are exhibited. Examples of the further component include further metal oxide added if necessary, and an element inevitably included.

Examples of the further metal oxide include $ZrO_2$, $Ta_2O_5$, $Nb_2O_5$, $Bi_2O_3$, and $MoO_3$, and among these, $ZrO_2$ is preferable. In addition, examples of the element inevitably included include C (carbon atom), P (phosphorus atom), and B (boron atom).

By setting $ZrO_2$ to 0.01% by mass or more, preferably 0.04% by mass or more, a grain boundary phase having a high specific resistance is sufficiently formed to suppress the generation of eddy current at a high frequency. On the other hand, by setting $ZrO_2$ to 0.1% by mass or less, preferably 0.08% by mass or less, it is possible to suppress $ZrO_2$ remaining as an impurity and suppress the deterioration of the loss.

The total content of the further metal oxide other than $ZrO_2$ and the element is preferably 0.1% by mass or less, and further preferably 0.01% by mass or less, per 100% by mass of the main components.

The present MnZn-based ferrite can be suitably used, for example, as a core material of an inductor used in a switching power supply circuit having a switching frequency of a high frequency (for example, 1 to 3 MHz). In addition, the present MnZn-based ferrite suppresses a change in magnetic properties even when a high magnetic field is applied, and thus can be suitably used for, for example, a transformer or a choke coil through which a large current may flow.

[Method for Producing MnZn-Based Ferrite]

Next, one embodiment of the method for producing a MnZn-based ferrite (hereinafter, also referred to as the present production method) will be described.

The present production method may be a production method that can suitably produce the present MnZn-based ferrite, including at least: a step (mixing step) of mixing raw materials including the main components, respectively, such that $Fe_2O_3$ is 53.2 to 56.0 mol % and ZnO is 3.0 to 12.0 mol %, with a balance of MnO, in 100 mol % of the main components, after sintering; a step (addition step) of adding raw materials including the auxiliary components, respectively, such that the present MnZn-based ferrite includes 0.005 to 0.060% by mass of $SiO_2$, 0.010 to 0.060% by mass of CaO, 0.10 to 0.40% by mass of $Co_2O_3$, and 0.05 to 0.30% by mass of $TiO_2$, per 100% by mass of the main components, after sintering; and a step (disintegration step) of disintegrating a mixed powder obtained until the mixed powder becomes a disintegrated powder having a D90 particle diameter of 1.2 μm or less. The present production method may further include a step such as a drying/granulation step of adding a binder to the mixed powder of the main components after the mixing step to obtain a granule; a calcination step of calcining the obtained granule; a drying/granulation step of the disintegrated powder; a molding step of molding the disintegrated powder or a granule thereof; or a heat treatment step (sintering step) of heat-treating the resulting molded product.

In the above mixing step, the main components are mixed such that the main components after sintering have the composition of the present MnZn-based ferrite. The form of the main components before mixing is not particularly limited, and is preferably the form of a powder because the powder is easy to handle and can be mixed uniformly. The raw material powders of the main components, respectively, are mixed and if necessary disintegrated to obtain a mixed powder. The mixing and disintegration methods may be appropriately selected from known methods. Specific examples thereof include an attritor and a bead mill. The particle diameter of the mixed powder is not particularly limited, and it is preferable to adjust the median diameter D50 to 0.5 μm to 1.5 μm from the viewpoint of uniformity or the like. The particle diameters D50 and D90 described later are the particle diameter (D50) where the cumulative particle diameter frequency is 50% and the particle diameter (D90) where the cumulative particle diameter frequency is 90%, respectively, when the particle size distribution of the target particle is measured. The particle size distribution of the mixed powder can be measured by using a particle size distribution measuring apparatus.

A drying/granulation step may be applied to the mixed powder of the above main components. In the drying/granulation step, a granule can be obtained, for example, by adding 0.5 to 1 part by mass of a binder such as polyvinyl alcohol when the total mass of the mixed powder is 100 parts by mass to the mixed powder obtained in the mixing step, and spraying the resulting mixture by using a spray dryer or the like.

Next, the obtained granule may be calcined at 750° C. for about 1 hour in an air atmosphere to obtain a calcined product (calcination step).

Next, the auxiliary components are added to the calcined product such that the auxiliary components after sintering have the composition of the present MnZn-based ferrite. The form of the auxiliary components before addition is not particularly limited, and is preferably the form of a particle because the particle is easy to handle and can be mixed uniformly.

After adding the auxiliary components, the resulting mixed powder is disintegrated to obtain a disintegrated powder. The disintegration may be appropriately adjusted such that the average crystal grain diameter of the MnZn-based ferrite obtained is 4 μm or less. Examples of a method therefor include a method involving disintegrating the calcined product until the particle diameter D90 after disintegration becomes 1.2 μm or less.

In the drying/granulation step, a granule is obtained by adding 0.5 to 1.0 part by mass of a binder such as polyvinyl alcohol when the total mass of the disintegrated powder is 100 parts by mass to the disintegrated powder obtained in the disintegration step, and spraying the resulting mixture by using a spray dryer or the like. At this time, the median diameter D50 of the granule is desirably 40 μm or more and 200 μm or less.

In the molding step, the granule obtained in the drying/granulation step is molded into a predetermined shape. The predetermined shape may be designed according to the application or the like. For example, the granule is molded into a toroidal type core having an outer diameter of 19 mm, an inner diameter of 13 mm, and a height of 11 mm.

The granule after molding is heat-treated to obtain a sintered body (the present MnZn-based ferrite). The heat treatment (sintering) conditions are preferably heating at 1050 to 1150° C. for several hours. By heat-treating at 1050° C. or more, it becomes easy to achieve a sintering density of 4.8 g/cm³ or more. On the other hand, by heat-treating at 1150° C. or less, it becomes easy to achieve an average crystal grain diameter of 4 μm or less.

According to the above production method, a MnZn-based ferrite having an average crystal grain diameter of 4 μm or less and a sintering density of 4.8 g/cm³ or more is preferably produced.

EXAMPLES

Hereinafter, the present invention will be specifically described with reference to Examples and Comparative Examples. The present invention is not limited by the descriptions thereof.

Example 1

Each raw material powder was weighed and mixed such that after sintering, the $Fe_2O_3$ content was 54.0 mol %, the ZnO content was 10.0 mol %, and the MnO content was 36.0 mol % to make a total of 100 mol %. To the above mixture, polyvinyl alcohol was added in an amount equivalent to 0.5 parts by mass per 100 parts by mass in total of the mixture, and the resulting mixture was sprayed by using a spray dryer to obtain a granule. Next, the granule was calcined at 750° C. for 1 hour in an air atmosphere to obtain a calcined product. Next, raw material powders of auxiliary components, respectively, were added such that SiO$_2$ was 0.03% by mass, CaO was 0.04% by mass, Co$_2$O$_3$ was 0.2% by mass, TiO$_2$ was 0.2% by mass, and ZrO$_2$ was 0.08% by mass, per 100% by mass of the main components.

Next, as a disintegration step, a mixture of the calcined product and the additives was disintegrated by using a disintegrator such that the particle diameter D90 after disintegration was 1.2 µm or less, to obtain a disintegrated powder. Next, as a drying/granulation step, when the total mass of the disintegrated powder was 100 parts by mass, 1 part by mass of polyvinyl alcohol was added to the disintegrated powder, and the resulting mixture was sprayed by using a spray dryer to obtain a granule. Next, as a molding step and a sintering step, the granule was molded into a toroidal type core having an outer diameter of 16 mm, an inner diameter of 10 mm, and a height of 5 mm, and sintered at 1100° C. to obtain a sintered body (MnZn-based ferrite).

Examples 2 to 16

MnZn-based ferrites of Examples 2 to 16 were obtained in the same manner in Example 1 except that in Example 1, the raw materials were mixed and added such that the content proportions of the main components and the auxiliary components after sintering were as shown in Table 1.

Comparative Example 1

A MnZn-based ferrite of Comparative Example 1 was obtained in the same manner in Example 1 except that in Example 1, the disintegration time was shortened and the particle diameter D90 of the powder after disintegration was 4.82 µm.

Comparative Examples 2 to 12

MnZn-based ferrites of Comparative Examples 2 to 12 were obtained in the same manner in Example 1 except that in Example 1, the raw materials were mixed and added such that the content proportions of the main components and the auxiliary components after sintering were as shown in Table 1.

<Evaluation>

The disintegration particle diameter D90 was determined by measuring the slurry of the disintegrated powder obtained in the production process of each of the above Examples and Comparative Examples by using a wet particle size distribution measuring apparatus.

The average crystal grain diameter was calculated by image analysis from an image obtained by mirror-polishing the MnZn-based ferrite obtained in each of the Examples and the Comparative Examples and then dissolving the grain boundary phase by etching followed by observation under a microscope. The measurement was carried out on 100 crystal grains for each.

The sintering density was measured by the Archimedes method.

In addition, Pcv and Pcv$_0$ of the MnZn-based ferrite were measured by using a BH analyzer, and the Pcv change rate was calculated by the above expression (1). Results thereof are shown in Table 1.

TABLE 1

| | Main components [mol %] | | | Auxiliary components [% by mass] | | | | | Disintegration particle diameter_D90 | Average crystal grain diameter | Sintering density | Pcv 2 MHz-50 | Pcv change rate |
|---|---|---|---|---|---|---|---|---|---|---|---|---|---|
| Example | Fe$_2$O$_3$ | MnO | ZnO | SiO$_2$ | CaO | ZrO$_2$ | Co$_2$O$_3$ | TiO$_2$ | [µm] | [µm] | [g/cc] | mT@25° C. | [%] |
| Comparative Example 1 | 54.0 | 36.0 | 10.0 | 0.030 | 0.040 | 0.08 | 0.20 | 0.2 | 4.82 | 4.32 | 4.71 | 1990 | 75 |
| Comparative Example 2 | 54.0 | 36.0 | 10.0 | 0.030 | 0.040 | 0.08 | 0.20 | 0.2 | 2.69 | 3.89 | 4.69 | 1710 | 69 |
| Example 1 | 54.0 | 36.0 | 10.0 | 0.030 | 0.040 | 0.08 | 0.20 | 0.2 | 1.12 | 3.95 | 4.92 | 1337 | 68 |
| Example 2 | 54.0 | 36.0 | 10.0 | 0.030 | 0.040 | 0.08 | 0.20 | 0.2 | 1.09 | 3.88 | 4.89 | 1432 | 58 |
| Comparative Example 3 | 54.0 | 36.0 | 10.0 | 0.030 | 0.040 | 0.08 | 0.20 | 0 | 1.13 | 3.89 | 4.92 | 1530 | 112 |
| Example 3 | 54.0 | 36.0 | 10.0 | 0.030 | 0.040 | 0.08 | 0.20 | 0.05 | 1.09 | 3.96 | 4.89 | 1490 | 98 |
| Example 4 | 54.0 | 36.0 | 10.0 | 0.030 | 0.040 | 0.08 | 0.20 | 0.1 | 1.15 | 3.87 | 4.90 | 1380 | 82 |
| Example 5 | 54.0 | 36.0 | 10.0 | 0.030 | 0.040 | 0.08 | 0.20 | 0.2 | 1.16 | 3.90 | 4.93 | 1350 | 69 |
| Example 6 | 54.0 | 36.0 | 10.0 | 0.030 | 0.040 | 0.08 | 0.20 | 0.3 | 1.08 | 3.91 | 4.95 | 1480 | 52 |
| Comparative Example 4 | 54.0 | 36.0 | 10.0 | 0.030 | 0.040 | 0.08 | 0.20 | 0.4 | 1.07 | 3.93 | 4.90 | 1620 | 43 |
| Example 7 | 53.5 | 35.5 | 11.0 | 0.035 | 0.050 | 0.08 | 0.20 | 0.2 | 1.03 | 3.87 | 4.94 | 1400 | 54 |
| Example 8 | 54.4 | 35.6 | 10.0 | 0.035 | 0.050 | 0.08 | 0.20 | 0.2 | 1.08 | 3.88 | 4.93 | 1380 | 68 |
| Example 9 | 53.8 | 37.7 | 8.5 | 0.035 | 0.050 | 0.08 | 0.20 | 0.2 | 1.11 | 3.92 | 4.91 | 1420 | 71 |
| Example 10 | 54.8 | 39.2 | 6.0 | 0.035 | 0.050 | 0.08 | 0.20 | 0.2 | 1.12 | 3.95 | 4.88 | 1450 | 88 |
| Comparative Example 5 | 54.1 | 35.9 | 10.0 | 0.033 | 0.045 | 0.10 | 0.05 | 0.2 | 1.04 | 3.87 | 4.94 | 1820 | 25 |
| Example 11 | 54.1 | 35.9 | 10.0 | 0.033 | 0.045 | 0.10 | 0.10 | 0.2 | 1.07 | 3.87 | 4.94 | 1450 | 50 |
| Example 12 | 54.2 | 35.7 | 10.1 | 0.033 | 0.045 | 0.10 | 0.40 | 0.2 | 1.11 | 3.93 | 4.93 | 1450 | 82 |
| Comparative Example 6 | 54.3 | 35.6 | 10.1 | 0.033 | 0.045 | 0.10 | 0.45 | 0.2 | 1.13 | 3.93 | 4.92 | 1550 | 99 |
| Comparative Example 7 | 54.2 | 35.8 | 10.0 | 0.000 | 0.010 | 0.01 | 0.20 | 0.2 | 1.05 | 3.89 | 4.88 | 1850 | 75 |
| Example 13 | 54.2 | 35.8 | 10.0 | 0.010 | 0.010 | 0.01 | 0.20 | 0.2 | 1.07 | 3.88 | 4.90 | 1490 | 73 |
| Example 14 | 54.3 | 35.6 | 10.1 | 0.050 | 0.010 | 0.01 | 0.20 | 0.2 | 1.10 | 3.96 | 4.94 | 1470 | 76 |

TABLE 1-continued

| Example | Main components [mol %] | | | Auxiliary components [% by mass] | | | | | Disintegration particle diameter_D90 [μm] | Average crystal grain diameter [μm] | Sintering density [g/cc] | Pcv 2 MHz-50 mT@25° C. | Pcv change rate [%] |
|---|---|---|---|---|---|---|---|---|---|---|---|---|---|
| | $Fe_2O_3$ | MnO | ZnO | $SiO_2$ | CaO | $ZrO_2$ | $Co_2O_3$ | $TiO_2$ | | | | | |
| Comparative Example 8 | 54.3 | 35.6 | 10.1 | 0.065 | 0.010 | 0.01 | 0.20 | 0.2 | 1.14 | | 4.98 | 1980 | 80 |
| Comparative Example 9 | 54.2 | 35.8 | 10.0 | 0.033 | 0.005 | 0.04 | 0.20 | 0.2 | 1.10 | 3.88 | 4.90 | 1600 | 74 |
| Comparative Example 10 | 54.3 | 35.6 | 10.1 | 0.033 | 0.065 | 0.04 | 0.20 | 0.2 | 1.14 | | 4.98 | 1850 | 79 |
| Comparative Example 11 | 54.2 | 35.8 | 10.0 | 0.033 | 0.045 | 0.005 | 0.20 | 0.2 | 1.11 | 3.91 | 4.91 | 1550 | 73 |
| Comparative Example 12 | 54.3 | 35.6 | 10.1 | 0.033 | 0.045 | 0.11 | 0.20 | 0.2 | 1.11 | 3.89 | 4.92 | 1560 | 78 |
| Example 15 | 55.4 | 35.6 | 9.0 | 0.035 | 0.050 | 0.08 | 0.20 | 0.2 | 1.10 | 3.89 | 4.89 | 1428 | 93 |
| Example 16 | 56.0 | 35.0 | 9.0 | 0.035 | 0.050 | 0.08 | 0.20 | 0.2 | 1.09 | 3.92 | 4.88 | 1366 | 98 |

SUMMARY OF RESULTS

It was shown that the MnZn-based ferrites of Examples 1 to 16 had a unit volume magnetic core loss (Pcv) at 25° C., 2 MHz, 50 mT of 1500 mW/cm³ or less, and a rate of change of the Pcv to that before a magnetic field was applied was 100% or less, in which $Fe_2O_3$ was 53.2 to 56.0 mol % and ZnO was 3.0 to 12.0 mol %, with a balance of MnO, in 100 mol % of the main components; the MnZn-based ferrites contained 0.005 to 0.060% by mass of $SiO_2$, 0.010 to 0.060% by mass of CaO, 0.10 to 0.40% by mass of $Co_2O_3$, and 0.05 to 0.30% by mass of $TiO_2$, as auxiliary components, per 100% by mass of the main components; the average crystal grain diameter was 4 μm or less; and the sintering density was 4.8 g/cm³ or more. From the above, it has been made clear that the present MnZn-based ferrite can suppress both reduction of the loss at a high frequency and a change in magnetic properties in a high magnetic field.

The present application claims priority based on Japanese Patent Application No. 2020-167723 filed on Oct. 2, 2020, the disclosure of which is incorporated herein by reference in its entirety.

The invention claimed is:

1. A MnZn-based ferrite comprising $Fe_2O_3$, ZnO, and MnO as main components, wherein $Fe_2O_3$ is 53.2 to 56.0 mol % and ZnO is 3.0 to 12.0 mol %, with a balance of MnO, in 100 mol % of the main components, the MnZn-based ferrite comprises 0.005 to 0.060% by mass of $SiO_2$, 0.010 to 0.060% by mass of CaO, 0.10 to 0.40% by mass of $Co_2O_3$, and 0.05 to 0.30% by mass of $TiO_2$, as auxiliary components, per 100% by mass of the main components, an average crystal grain diameter is 4 μm or less, and a sintering density is 4.8 g/cm³ or more.

2. The MnZn-based ferrite according to claim 1, further comprising 0.010 to 0.100% by mass of $ZrO_2$ as an auxiliary component.

3. The MnZn-based ferrite according to claim 1, wherein a unit volume magnetic core loss (Pcv) at 25° C., 2 MHz, and 50 mT is 1500 mW/cm³ or less.

4. The MnZn-based ferrite according to claim 1, wherein a rate of change of a unit volume magnetic core loss (Pcv) at 25° C., 2 MHz, and 50 mT represented by the following expression (1) to that before a magnetic field is applied is 100% or less:

$$(Pcv - Pcv_0)/Pcv_0 \times 100 \qquad \text{Expression (1)}$$

where $Pcv_0$ is a unit volume magnetic core loss before a magnetic field is applied.

5. A method for producing the MnZn-based ferrite according to claim 1, the method comprising:

a step of mixing raw materials comprising the main components, respectively, such that $Fe_2O_3$ is 53.2 to 56.0 mol % and ZnO is 3.0 to 12.0 mol %, with a balance of MnO, in 100 mol % of the main components, after sintering;

a step of adding raw materials comprising the auxiliary components, respectively, such that the MnZn-based ferrite comprises 0.005 to 0.060% by mass of $SiO_2$, 0.010 to 0.060% by mass of CaO, 0.10 to 0.40% by mass of $Co_2O_3$, and 0.05 to 0.30% by mass of $TiO_2$, per 100% by mass of the main components, after sintering; and a step of disintegrating a mixed powder obtained until the mixed powder becomes a disintegrated powder having a D90 particle diameter of 1.2 μm or less.

6. The method for producing the MnZn-based ferrite according to claim 5, further comprising a step of molding the disintegrated powder and heat-treating a resulting molded product at 1050 to 1150° C.

* * * * *